United States Patent [19]

Freedman

[11] Patent Number: 5,603,284
[45] Date of Patent: Feb. 18, 1997

[54] METHOD OF PACKAGING A FOAM ARTICLE, AND A FOAM ARTICLE AS SO PACKAGED

[76] Inventor: Clive A. H. Freedman, Pinehurst, 22 Sheldon Grove, Gosforth, Newcastle upon Tyne, NE3 4JP, England

[21] Appl. No.: 527,246

[22] Filed: Sep. 12, 1995

Related U.S. Application Data

[63] Continuation of Ser. No. 257,283, Jun. 9, 1994, abandoned.

[30] Foreign Application Priority Data

Jun. 12, 1993 [GB] United Kingdom ............... 9312155

[51] Int. Cl.⁶ .................................................. A01K 1/035
[52] U.S. Cl. ........................................... 119/28.5; 53/436
[58] Field of Search ........................... 119/28.5; 53/436, 53/526

[56] References Cited

U.S. PATENT DOCUMENTS

| | | | |
|---|---|---|---|
| 3,246,443 | 4/1966 | Slemmons | 53/436 |
| 4,418,514 | 12/1983 | Spann | 53/436 |
| 5,265,558 | 11/1993 | Schönrock | 119/28.5 |
| 5,445,275 | 8/1995 | Curley et al. | 206/525 |
| 5,497,729 | 3/1996 | Lord . | |

FOREIGN PATENT DOCUMENTS

| | | | |
|---|---|---|---|
| 2514990 | 4/1983 | France | 119/28.5 |
| 893817 | 4/1962 | United Kingdom . | |
| 2124580 | 2/1984 | United Kingdom . | |

*Primary Examiner*—Robert P. Swiatek
*Attorney, Agent, or Firm*—Larson and Taylor

[57] ABSTRACT

A method of flat-packing an article of plastics foam, for example a pet bed including a cushion and a surrounding sidewall, comprises the steps of locating the article in an open-ended bag of a flexible, airtight material such as transparent polythene and/or nylon, compressing the article such that air is expelled from the article and from the bag through the open end of the bag, and such that the article is flattened to a fraction of its original thickness, for example 20% of its original thickness, and sealing the open end of the bag to retain the compressed article therein. The foam is preferably polyurethane that can recover to of the order of 95% of its original thickness even after prolonged compression of up to one year.

12 Claims, 1 Drawing Sheet

METHOD OF PACKAGING A FOAM ARTICLE, AND A FOAM ARTICLE AS SO PACKAGED

This application is a continuation of U.S. Ser. No. 08/257,283, filed Jun. 9, 1994 abandoned.

BACKGROUND OF THE INVENTION

This invention relates to a method of packaging a foam article, and more particularly to a method of so called 'flat-packing' a plastics foam article, for example a pet bed, as well as to an article packaged according to the method.

Pet beds commonly comprise a fabric-covered foam cushion surrounded by an upstanding sidewall, usually circular or oval, the sidewall itself consisting of fabric-covered foam, some beds being provided with a reduced-height extent in the sidewall for entry to and exit from the bed by a pet, for example a cat or dog.

Such beds are produced in a variety of sizes ranging from typically 35 cms to 106 cms in diameter, therefore being suitable for domestic animals ranging from small kittens to large dogs.

Beds of this type are relatively bulky, and, although the different sizes of beds can be stacked one within the other, transportation, storage and display can pose problems.

In particular, the area of shelf-space required to display such a product in its natural condition in a supermarket or like retail outlet is considerably more than is warranted by the financial yield from the product.

It has been proposed, for the purposes of transportation, storage, and display, to remove the cushion from the bed, to wrap the cushion and sidewall up together, and to put the wrapped-up product in a cardboard sleeve. This clearly reduces the volume of the product, but has a number of disadvantages.

In particular, the product is unattractive to the potential customer who can't fully appreciate what is in the package, while the foam used in conventional pet beds is not such that it springs back to its original shape if it has been left compressed in the sleeve for some time, and the space saved is not considerable compared with a nested set of beds.

SUMMARY OF THE INVENTION

It is an object of the invention to provide a method of packaging a foam article which overcomes the aforementioned disadvantages, and in particular which produces a compact, attractive product.

According to the present invention, there is provided a method of packaging a foam article comprising the steps of:
  a) locating the article in a bag of a flexible, airtight material one end of which is open;
  b) compressing the article in such a manner that air is expelled from the article and from the bag though the open end of the bag, and
  c) sealing the open end of the bag to retain the compressed article therein.

Such a method enables a substantially flat-packed article to be achieved, compression preferably having occurred in one plane, and the material of the bag preferably being transparent whereby the flattened article can be viewed therethrough.

The method has particular, though not exclusive, application to the packaging of pet beds comprising a foam cushion surrounded by an upstanding sidewall of foam.

In the application of the method to such an article, the cushion is removed from within the sidewall, the opposed halves of the sidewall are flattened one against the other, the cushion is laid in or on the flattened sidewall, and the components of the bed are located in the open-ended bag.

Compression occurs in a plane substantially perpendicular to that containing the cushion and the flattened sidewall, and is preferably carried out to reduce the foam to of the order of 20% of its natural thickness.

A preferred foam is a polyurethane foam that can recover from its compressed condition to at least 95% of its original thickness.

The compression step is conveniently carried out in such a manner that the bag and the article therein are gradually compressed from the rear end of the bag remote from the open end thereof towards the front end thereof, whereby pressure build-up within the rear regions of the bag is prevented.

In a preferred method, compression is achieved using an hydraulic press comprising upper and lower platens hinged together and between which the article is located, angular movement of one of the platens relative to the other platen about the hinge resulting in said gradual compression of the article in a direction from the rear end of the bag towards the open end thereof.

Conveniently the press incorporates means for sealing the bag after the compression stroke, for example a heat sealing mechanism the components of which are mounted one at or adjacent the free end of each platen to receive therebetween the open end of the bag on completion of the compression stroke.

DESCRIPTION OF THE PREFERRED EMBODIMENT

Figure 1:
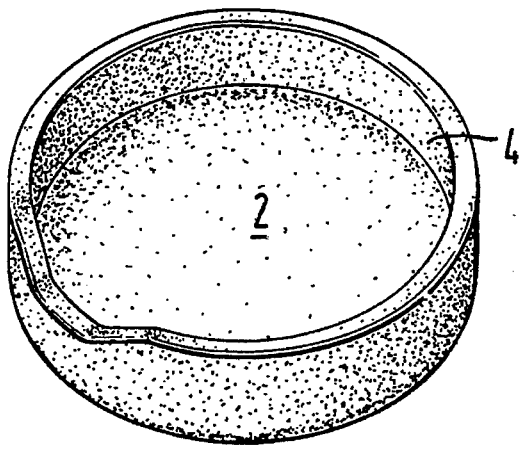
FIG. 1 shows an article to be compressed by the method of the invention.

Referring to the drawings, FIG. 1 shows a conventional pet bed which includes a fabric covered foam cushion 2 surrounded by an upstanding sidewall 4 comprising fabric-covered foam, said sidewall including a fabric base (not shown) extending across the lower end of the sidewall to provide a support for the cushion 2.

The foam of the cushion 2 and the sidewall 4 is preferably polyurethane which can be compressed to 20% of its original thickness and which recovers naturally to at least 95% of its original thickness even after being compressed for at least one year.

Figure 2:
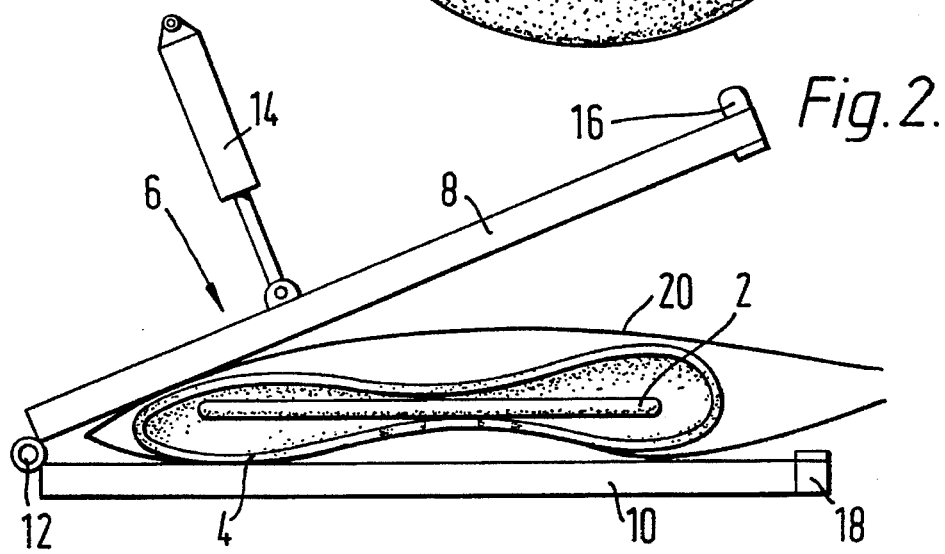
FIG. 2 shows the article of FIG. 1 located in an hydraulic press prior to compression.
Figure 3:
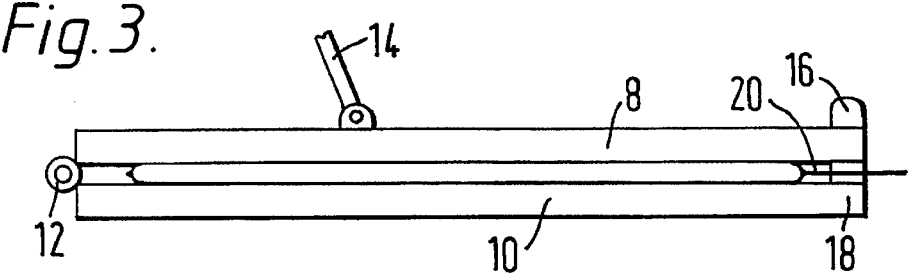
FIG. 3 shows the hydraulic press of FIG. 2 in the compressed condition.

The pet bed is compressed by means of a hydraulic press illustrated schematically in FIGS. 2 and 3 and generally referenced 6. The press 6 comprises upper and lower platens 8, 10 hinged together at 12, the upper platen 8 being movable angularly about the hinge 12 relative to the platen 10 under the influence of a hydraulic ram 14. The free ends of the platens 8, 10 remote from the hinge 12 incorporate upper and lower components 16, 18 of a heat sealing or welding mechanism for reasons that will become apparent.

Compression of the bed is achieved by first of all removing the cushion 2 from the sidewall 4, squashing the sidewall 4 until the opposed regions thereof overlie one another, laying the cushion 2 in or on the squashed sidewall 4, and inserting the cushion 2 and sidewall 4 into an open-ended bag 20 of a flexible, airtight material such as a laminate of transparent polythene and nylon.

In regions of potentially high humidity, it may be desirable, before inserting the folded bed into the bag 20, to ascertain the humidity level, and to dehumidify the bed if the humidity level is above a predetermined maximum value.

The bag 20 is preferably as near to the size of the squashed product as possible so that the bag 20 itself holds the product therein in a slightly compressed condition—the overall thickness of the product in this condition may be of the order of 10 cms.

The bag 20 and the pet bed therein are positioned in the press 6 with the open front end of the bag 20 overlying the free end of the lower platen 18 and with the rear end of the bag 20 adjacent the hinge 12 as seen in FIG. 2.

The ram 14 is actuated to pivot the platen 8 about the hinge 12 towards the platen 10 whereby the rear regions of the bag 20 and its contents are initially compressed and whereby air within the bag 20 is forced from the rear of the bag towards the open front thereof to be expelled therefrom.

Thus the bag 20 and the bed therein are gradually compressed in a manner which prevents build-up of air pressure within the rear regions of the bag 20 that might otherwise cause damage to or bursting of said bag Once the press is fully closed as shown in FIG. 3, and the foam within the bag 20 has thereby been compressed to about 20% of its original thickness and the bag 20 has been completely evacuated, the components 16, 18 of the welding mechanism overlie one another with the open end of the bag 20 therebetween.

Figure 4:
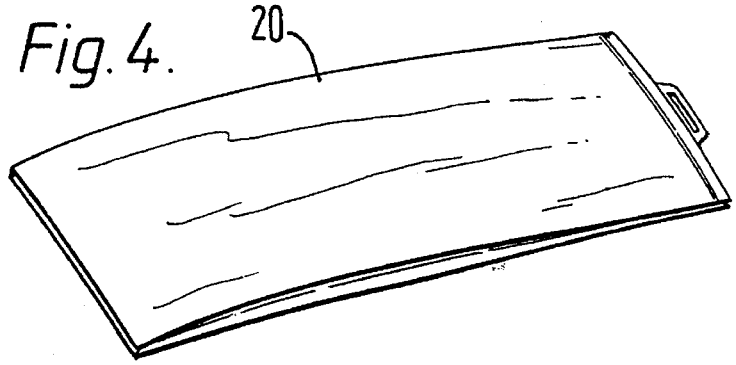
FIG. 4 shows the article flat packed by the method of the invention.

This mechanism is then actuated to heat seal the bag 20 to retain the contents therein, and the product is removed from the press 6 in the flat-packed condition shown in FIG. 4.

It will be appreciated that the product so formed is extremely compact, the length of the product being of the order of 1.5 times the diameter of the pet bed therein, the width of the product being about the height of the sidewall 4, and the thickness of the product being about 2 cms. Thus the aforementioned problems associated with transportation and display are overcome, while, as the bag 20 is transparent, the contents of the package are clearly visible to the potential customer.

It will be appreciated that the method of the invention is applicable to the packaging of foam articles other than pet beds, for example pillows, upholstery cushions and the like, while the apparatus for effecting the compression may vary from that shown. For example, a vertical press, rather than a hinged press, may be used, or, alternatively, rollers or a conveyor belt may be used instead of a press. Sealing of the bag 20 may be achieved other than by welding, for example by use of an adhesive, while the bag 20 itself may be of a material other than polythene and/or nylon providing it is of sufficient strength to resist the reverse pressure exerted thereon after compression of the contents.

As mentioned above, the foam being compressed is preferably a high quality, high density foam capable of substantially full recovery after extended compression whereby the product, on removal from its packaging, springs back to its original shape, and achieves this within about 3 minutes.

The packaging of the pet bed in the above manner has the its original shape, and achieves this within about 3 minutes.

The packaging of the pet bed in the above manner has the additional advantage that, being completely sealed from factory to customer, it is totally hygienic and cannot be contaminated by fleas or the like even if it is sold from a pet shop where the potential for such contamination is rife.

What I claim and desire to secure by Letters Patent is:

1. A method of packaging a pet bed including a foam cushion surrounded by a separate, upstanding sidewall of foam, the method comprising the steps of:
    a) removing the cushion from the sidewall;
    b) flattening the opposed halves of the sidewall against one another;
    c) laying the cushion on the flattened sidewall;
    d) locating the cushion and sidewall in a bag of a flexible airtight material one end of which is open;
    e) compressing the pet bed in such a manner that the bag and cushion and sidewall therein are gradually compressed from the rear end of the bag remote from the open end thereof towards the front end thereof with air being expelled from the bag through the open end of the bag, and
    f) sealing the open end of the bag to retain the compressed pet bed therein.

2. A method as claimed in claim 1 in which the pet bed is compressed to of the order of 20% of its original thickness, and the foam of the cushion and the sidewall is a polyurethane foam capable of recovering from its compressed condition to of the order of 95% of its original thickness.

3. A foam pet bed packaged according to the method of claim 1.

4. A method of packaging a foam pet bed comprising locating a foam pet bed in a bag of a flexible, airtight material, one end of said bag being open, compressing the foam pet bed in such a manner that air is expelled from the foam pet bed and from the bag through the open end of the bag, and sealing the open end of the bag to retain the compressed foam pet bed therein, said pet bed including a foam cushion surrounded by a separate, upstanding foam sidewall, the method further comprising the steps of, prior to locating the foam pet bed in the bag, flattening the opposed halves of the sidewall against one another; and laying the foam cushion on the flattened sidewall.

5. A method as claimed in claim 4 in which compression occurs in a direction substantially perpendicular to the plane containing the cushion and the flattened sidewall.

6. A method as claimed in claim 5 in which the pet bed is compressed to 20% of its natural thickness.

7. A method as claimed in claim 6 wherein said foam is capable of recovering from its compressed condition to at least 95% of its original thickness.

8. A method as claimed in claim 7 in which the compression step is carried out in such a manner that the bag and pet bed therein are gradually compressed from the rear end of the bag remote from the open end thereof towards the front end thereof.

9. A method as claimed in claim 8 in which compression is achieved using a hydraulic press comprising upper and lower platens hinged together and between which the pet bed and bag are located, angular movement of one of the platens relative to the other platen about the hinge resulting in said gradual compression of the pet bed in a direction from the rear end of the bag towards the open end thereof.

10. A method as claimed in claim 9 in which the press incorporates means for sealing the bag after the compression stroke.

11. A method as claimed in claim 10 in which said means comprises a heat sealing mechanism the components of which are mounted one at or adjacent the free end of each platen to receive therebetween the open end of the bag on completion of the compression stroke.

12. A foam pet bed packaged according to the method of claim 4.

* * * * *